US006557402B1

(12) United States Patent
Nemie, Jr.

(10) Patent No.: US 6,557,402 B1
(45) Date of Patent: May 6, 2003

(54) POROUS METAL FLOW MASTER

(75) Inventor: Edward J. Nemie, Jr., Newport News, VA (US)

(73) Assignee: Siemens Automotive Corporation, Auburn Hills, MI (US)

( * ) Notice: Subject to any disclaimer, the term of this patent is extended or adjusted under 35 U.S.C. 154(b) by 0 days.

(21) Appl. No.: 09/216,428

(22) Filed: Dec. 18, 1998

(51) Int. Cl.[7] .......................... G01M 15/00; G01M 3/04

(52) U.S. Cl. ........................... 73/119 A; 73/49.7; 73/40

(58) Field of Search ................................ 73/39, 40, 46, 73/47, 49.7, 119 A

(56) References Cited

U.S. PATENT DOCUMENTS 4,559,815 A * 12/1985 Needham .................... 73/49.7
5,195,362 A * 3/1993 Eason ........................ 73/49.7
5,795,995 A * 8/1998 Shimaoka et al. ............. 73/40
6,152,162 A * 11/2000 Balazy et al. ............... 137/110

* cited by examiner

*Primary Examiner*—Eric S. McCall
*Assistant Examiner*—Maurice Stevens

(57) ABSTRACT

A flow master for testing a leak test head includes a housing having an upper body portion and a lower body portion, the housing defining a passageway therethrough, the housing further defining an internal volume substantially equal to a fuel volume of a fuel injector to be tested; and a porous metal flow restrictor disposed in the passageway. A method of testing a leak test head includes providing a flow master; measuring a flow rate of the flow master from a known standard; connecting the flow master to the leak test head; pressurizing the leak test head; measuring a flow rate through the flow master using the leak test head; and comparing the flow rate measured by the leak test head to the flow rate measured by the known standard to determine if the leak test head is accurate.

22 Claims, 2 Drawing Sheets

POROUS METAL FLOW MASTER

BACKGROUND OF THE INVENTION

The present invention relates generally to fuel injectors and, in particular, to a flow master for testing leak test heads that are used to test fuel injectors.

Fuel injectors typically comprise an electromagnetically actuated needle valve disposed in a fuel volume. The needle valve is reciprocated axially within the fuel volume in response to energization and deenergization of an actuator to selectively open and close a flow path through the fuel injector. Particularly, the valve body or housing defining the fuel volume has an aperture or orifice at one end forming a seat for the end of the needle valve whereby its reciprocating motion enables an intermittent flow of fuel through the orifice. Typically, the fuel emitted from a fuel injector is atomized downstream of the orifice to provide the necessary fuel/air mixture in the combustion chamber of the engine.

Referring now to FIG. 1, there is illustrated a prior art fuel injector, generally designated 10, including a housing assembly 12 mounting a coil assembly 14 and an armature 16 coupled to a needle valve 18. Surrounding the needle valve 18 is a housing 22 defining a fuel volume 24 in communication with a fuel flow passage 20 through the armature 16. At the lower end of housing 22 is a valve seat 26 defining an orifice 28 through which fuel is ejected from the fuel ejector into the engine. The coil 14 and armature 16 cooperate to open and close orifice 28 by periodic axial movement of needle valve 18 within fuel volume 24.

Fuel injectors are pressure tested using a leak test head to ensure that there is not too much leakage. The fuel injector is connected to a leak test head which is then pressurized. The leak test head measures the pressure loss through the fuel injector. If the pressure loss is greater than a predetermined amount, then the fuel injector is rejected as unsatisfactory.

The leak test heads are also tested to ensure that they are accurate. The leak test heads are tested with a flow master.

Previous flow masters were bulky and expensive. The physical size of previous flow masters prevented using them on every leak test head simultaneously. Therefore, the process of testing leak test heads was very time consuming.

SUMMARY OF THE INVENTION

It is an object of the present invention to provide an improved method and apparatus for testing leak test heads used to test fuel injectors for leakage.

This and other objects of the invention are achieved by a flow master for testing a leak test head comprising a housing having an upper body portion and a lower body portion, the housing defining a passageway therethrough, the housing further defining an internal volume substantially equal to a fuel volume of a fuel injector to be tested; and a porous metal flow restrictor disposed in the passageway.

Preferably, the flow master further comprises a porous metal sintered filter disposed in the upper body portion of the housing.

Another aspect of the invention is a method of testing a leak test head comprising providing a flow master; measuring a flow rate of the flow master from a known standard; connecting the flow master to the leak test head; pressurizing the leak test head; measuring a flow rate through the flow master using the leak test head; and comparing the flow rate measured by the leak test head to the flow rate measured by the known standard to determine if the leak test head is accurate.

Further objects, features and advantages of the invention will become apparent from the following detailed description taken in conjunction with the accompanying drawing.

DETAILED DESCRIPTION OF THE PREFERRED EMBODIMENTS

Figure 2:
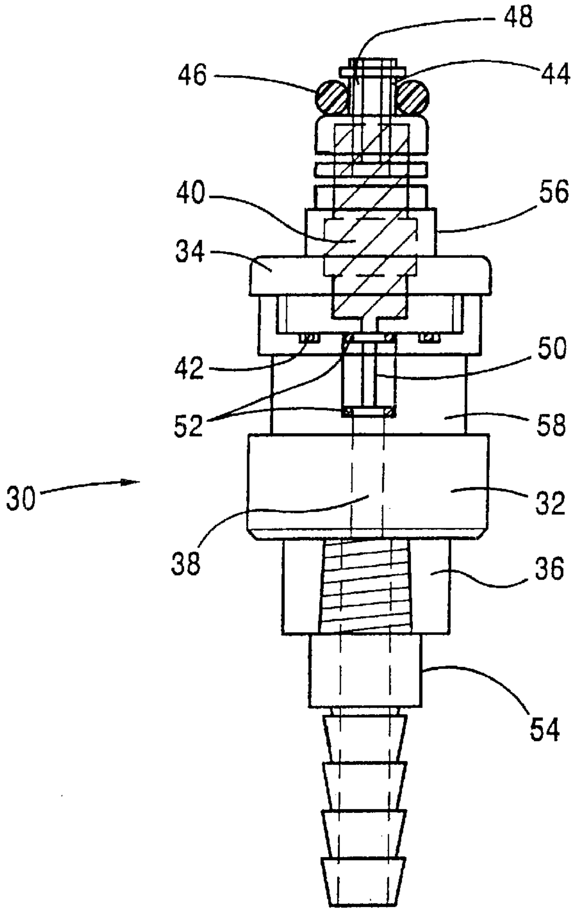
FIG. 2 is a side view of an embodiment of the flow master of the present invention wherein the housing of the flow master appears transparent so that the internal structure may be seen.
Figure 4:
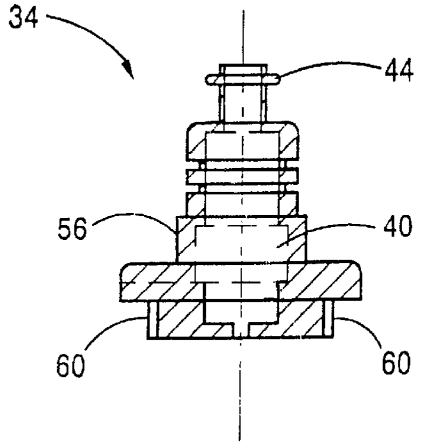
FIG. 4 is a cross-sectional view of the upper body portion of the housing of the flow master.
Figure 3:
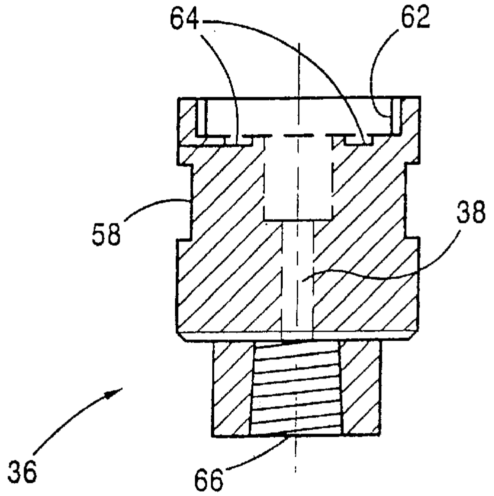
FIG. 3 is a cross-sectional view of the lower body portion of the housing of the flow master.

FIG. 2 is a side view of an embodiment of a flow master 30 according to the present invention. The flow master 30 comprises a housing 32 including an upper body portion 34 and a lower body portion 36. FIGS. 3 and 4 are cross-sectional views of the lower and upper body portions 36, 34, respectively. In FIG. 2, the housing 32 is shown as transparent so that the internal structure of the flow master 30 may be more easily understood. The housing 32 is preferably made of stainless steel, in particular, 440C stainless steel.

Figure 1:
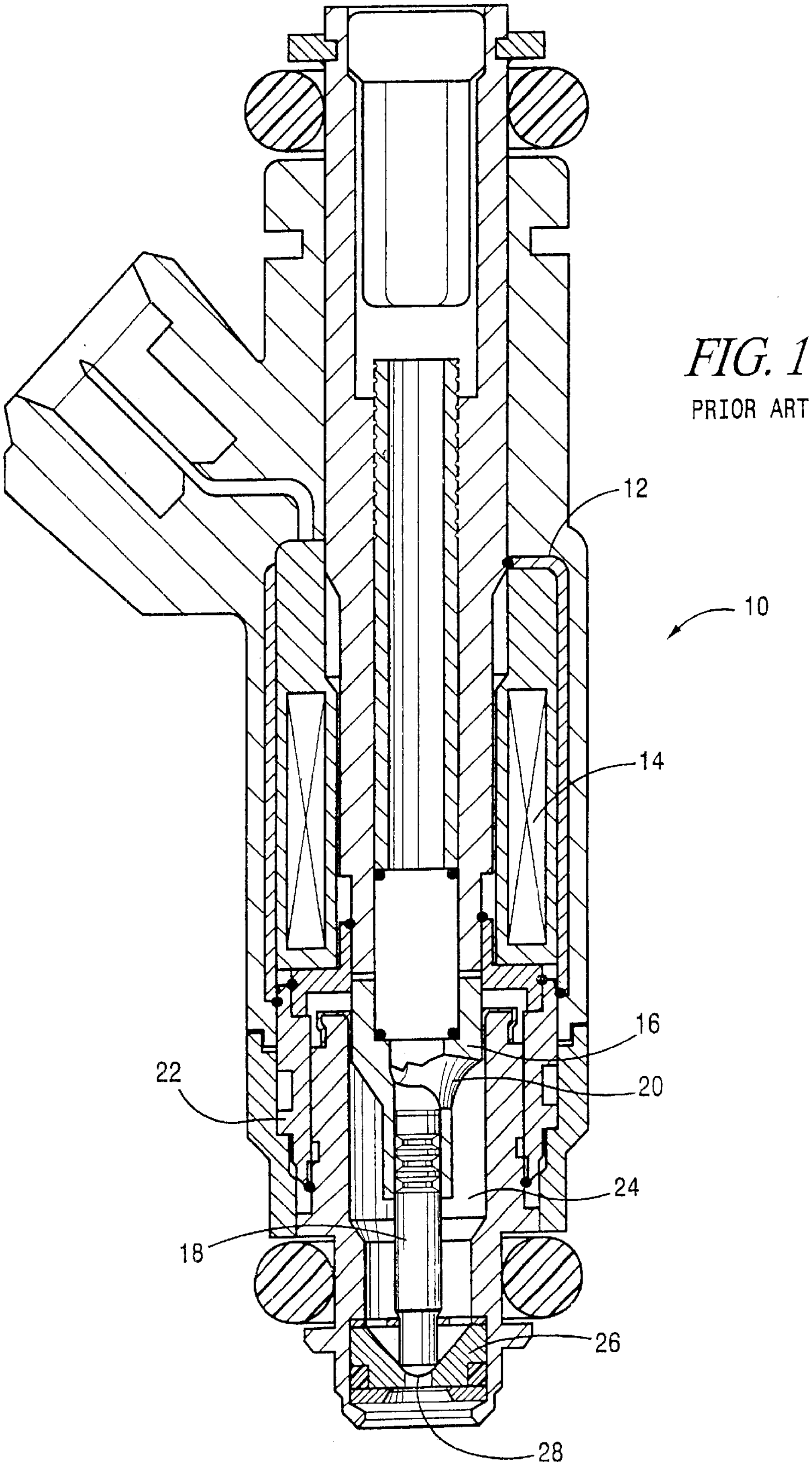
FIG. 1 PRIOR ART
FIG. 1 shows a known fuel injector.

The housing 32 defines a passageway 38 throughout the entire length of the flow master 30. A portion of the passageway 38 defines a volume 40 which is substantially equal to the sum of the volumes of the fuel volume 24 and the fuel flow passage 20 in the fuel injector of FIG. 1. In FIG. 2 the internal volume 40 is indicated by cross hatching. In the flow master of FIG. 2, the internal volume 40 is in the upper body portion 34.

The upper and lower body portions 34, 36 are threadably engaged. External threads 60 on upper body portion 34 cooperate with internal threads 62 on lower body portion 36. An O-ring 42 seals the surface between the upper body portion 34 and the lower body portion 36. The O-ring 42 is disposed in a channel 64 (FIG. 3) in the lower body portion 36.

On the exterior of the upper body portion 34, a retainer 44 is formed. Below the retainer 44 is an O-ring 46. The retainer 44 and O-ring 46 are similar to those on a fuel injector so that the flow master 30 may be inserted into the leak test head in the same manner as a fuel injector.

A porous metal sintered filter 48 is disposed in the top of the upper body portion 34. The porous metal sintered filter 48 is commercially available. Preferably, the porous metal sintered filter 48 is a 5 micron filter.

A porous metal flow restricter 50 is disposed in the lower body portion 36. The porous metal flow restricter 50 is commercially available. Exemplary flow rates for the flow restricter 50 are 0.1, 0.2 and 0.5 cubic centimeters per minute. The flow restricter 50 is sealed in the passageway 38 by a pair of O-rings 52.

If desired, a hose barb 54 may be connected to the lower body portion 36 to provide a hose connection to collect fluid which flows through the flow master 30. The hose barb 54 is preferably threadably engaged to the lower body portion 36 at threads 66.

The upper body portion 34 and the lower body portion 36 include wrench flats 56, 58 respectively, for assembling and disassembling the flow master 30. Because the housing 32 of the flow master is made with an upper body portion 34 and a lower body portion 36, the flow restricter 50 may be changed by disassembling the upper and lower body portions.

The flow master 30 is used to test leak test heads. The leak test heads are used to test the leakage through fuel injectors. Fuel injectors may leak at a variety of locations, but primarily they leak where the needle valve meets the seat. Thus, it is important to test the fuel injector to be sure that the leakage is an acceptable amount. The leak test head is used to test the fuel injector. The fuel injector is inserted in the leak test head. The leak test head is then pressurized and the pressure decay through the fuel injector is measured by the leak test head.

The leak test heads must also be tested to ensure that their pressure readings are accurate. The function of the flow master 30 is to test the leak test head to ensure that the pressure readings are accurate. The flow master 30 is used whenever maintenance or ISO calibration is due on leak test heads. The flow master 30 can have several different flow ratings. The flow restricter 50 regulates the flow.

Initially, the flow rate through the flow master 30 is checked against a known standard, for example, by using a Furness FCS-274 to establish the flow master flow rate. Once the flow master flow rate is known, the flow master 30 can then be used to test the function of the leak test head. The flow master 30 is connected to the leak test head and the leak test head is then pressurized. The leak test head should repeat the pressure readings obtained from the known standard if the leak test head is working correctly.

While the invention has been disclosed with reference to certain preferred embodiments, numerous alterations, changes and modifications to the described embodiments are possible without departing from the spirit and scope of the invention, as defined in the appended claims and equivalents thereof.

What is claimed is:

1. A device for testing a leak test head, comprising:

a housing having an upper body portion and a lower body portion, the housing defining a passageway therethrough, the housing further defining a predetermined internal volume related to a fuel volume of a fuel injector to be tested; and a porous metal flow restrictor disposed in the passageway proximate one of the upper and lower body portions, the housing and the porous metal flow restrictor adapted to test a leak test head.

2. The flow master of claim 1 wherein the internal volume is defined in the upper body portion.

3. The flow master of claim 1 further comprising a porous metal sintered filter disposed in the upper body portion of the housing.

4. The flow master of claim 1 wherein the upper and lower body portions are threadably engaged.

5. The flow master of claim 4 wherein the upper and lower body portions are sealed together with an O-ring.

6. The flow master of claim 1 wherein the upper body portion includes a retainer and an O-ring for sealing the flow master to the leak test head.

7. The flow master of claim 1 further comprising a pair of O-rings disposed at opposite ends of the porous metal flow restrictor for sealing the porous metal flow restrictor in the passageway.

8. The flow master of claim 1 further comprising a hose barb connected to the lower body portion.

9. The flow master of claim 8 wherein the hose barb is threadably engaged to the lower body portion.

10. The flow master of claim 1 wherein the housing is made of stainless steel.

11. The flow master of claim 1 wherein the upper and lower body portions include wrench flats.

12. The flow master of claim 1 wherein the porous metal flow restrictor is calibrated to a flow rate of one of 0.1, 0.2, and 0.5 cubic centimeters per minute.

13. A method of testing a leak test head, comprising:

providing a device with a housing, the housing having a passageway between an upper body portion and a lower body portion, and a porous metal flow restrictor disposed in the passageway;

measuring a flow rate of the device from a predetermined value;

connecting the device to the leak test head;

pressurizing the leak test head;

measuring a flow rate through the device using the leak test head; and comparing the flow rate measured by the leak test head to the flow rate measured by the predetermined value to determine if the leak test head is accurate.

14. The method of claim 13 wherein the housing further defining a predetermined internal volume related to a fuel volume of a fuel injector to be tested.

15. The method of claim 14 wherein the internal volume is defined in the upper body portion.

16. The method of claim 14 wherein the device further comprises a porous metal sintered filter disposed in the upper body portion of the housing.

17. The method of claim 14 wherein the upper and lower body portions are threadably engaged.

18. The method of claim 17 wherein the upper and lower body portions are sealed together with an O-ring.

19. The method of claim 18 wherein the upper body portion includes a retainer and an O-ring for sealing the device to the leak test head.

20. The method of claim 19 wherein the device further comprises a pair of O-rings disposed at opposite ends of the porous metal flow restrictor for sealing the porous metal flow restrictor in the passageway.

21. A flow master for pressure testing a test unit, the flow master comprising:

an upper body portion extending between a first upper body end and a second upper body end along a longitudinal axis, the upper body portion including:

an opening proximate the first upper body end, the first upper body end having a retainer and an O-ring adapted to be inserted into the test unit;

a first passageway extending between the first upper body end and second upper body end, the first passageway defining a fluid volume generally equal to a fuel volume of a fuel injector;

a first threaded portion proximate the second upper body end; and a lower body portion end extending between a first lower body end and a second lower body end along the longitudinal axis, the lower body portion including:

a second threaded portion proximate the first lower body end, the second threaded portion being coupled to the first threaded portion;

a second passageway extending between the first lower body end and the second lower body end, the second passageway aligned with the first passageway along the longitudinal axis;

a porous metal flow restrictor located in the second passageway; and a barbed fitting proximate the second lower end.

22. The flow master of claim 21, wherein the porous metal flow restrictor including a porous metal flow restrictor calibrated to a flow rate of at least one of 0.1, 0.2 or 0.5 cubic centimeter per minute.

* * * * *